April 29, 1958     T. A. WIEDEMANN     2,832,439
HIGH SPEED FOLLOWER GAUGE CONTROL CLAMP
Original Filed Sept. 22, 1950     2 Sheets-Sheet 1
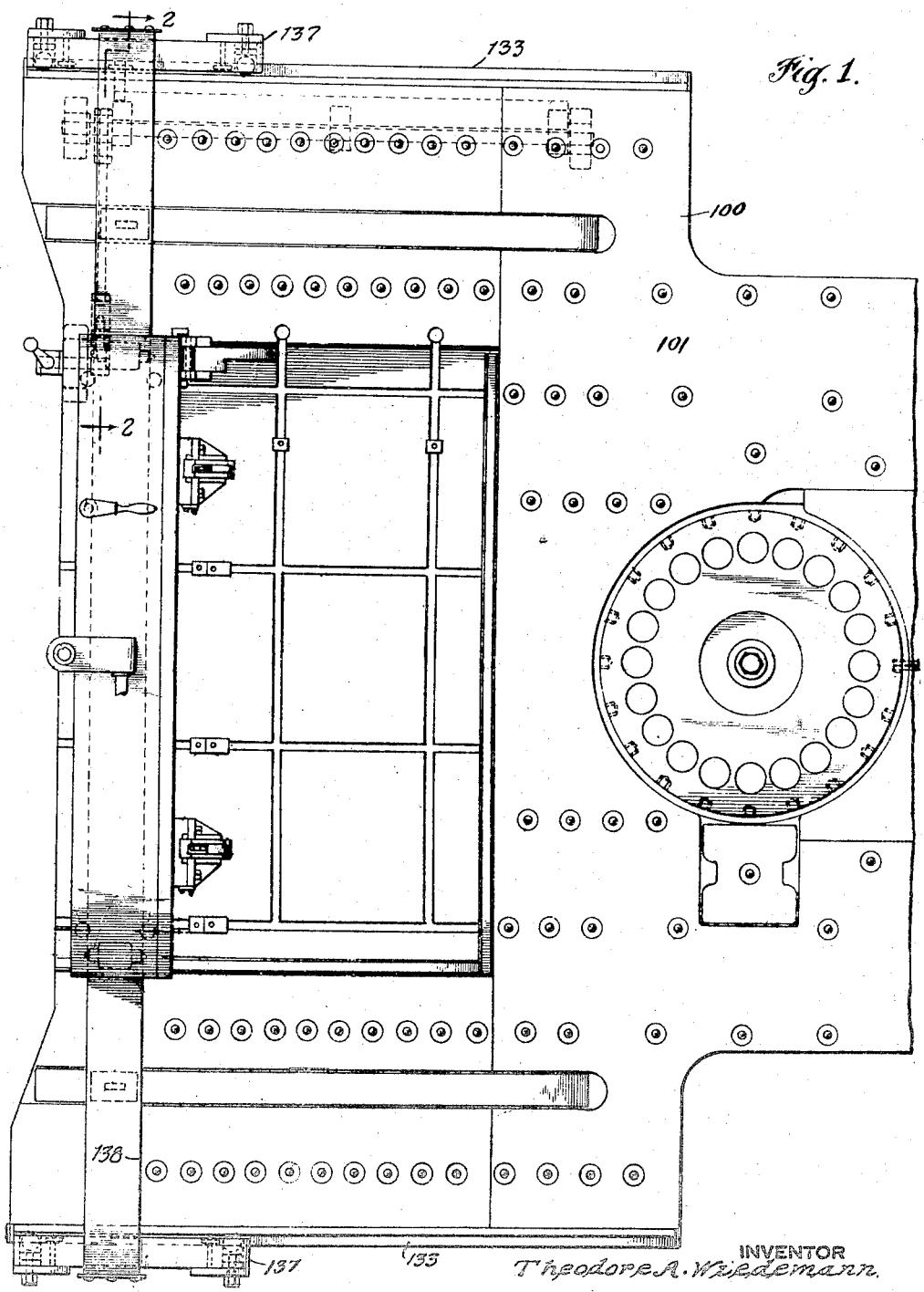

April 29, 1958  T. A. WIEDEMANN  2,832,439
HIGH SPEED FOLLOWER GAUGE CONTROL CLAMP
Original Filed Sept. 22, 1950  2 Sheets-Sheet 2
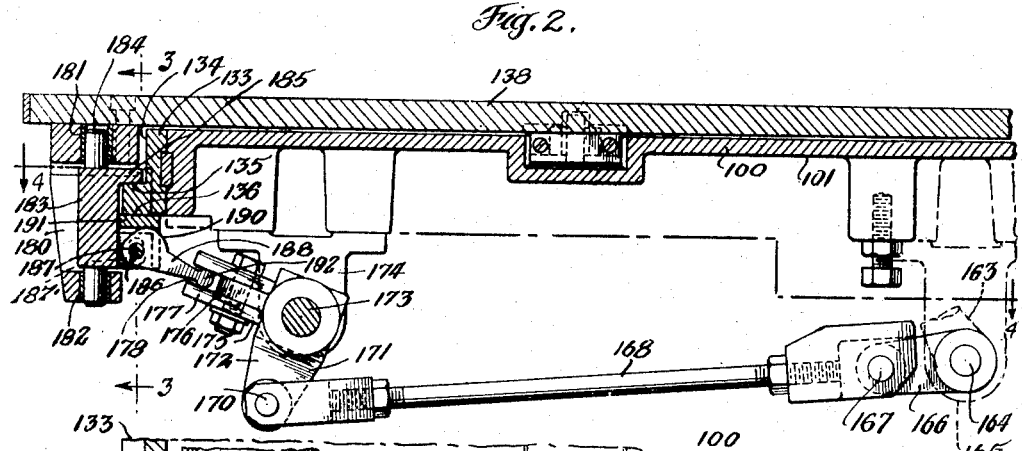
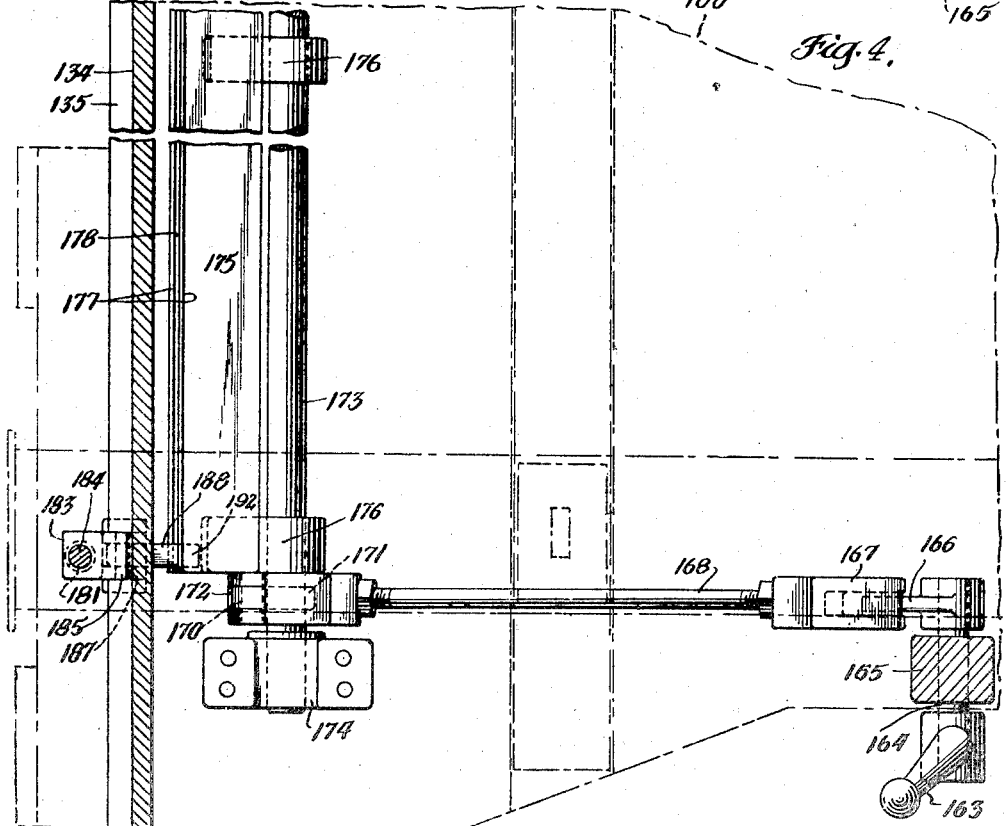
INVENTOR
Theodore A. Wiedemann.
BY
ATTORNEYS

United States Patent Office 2,832,439
Patented Apr. 29, 1958

2,832,439

HIGH SPEED FOLLOWER GAUGE CONTROL CLAMP

Theodore A. Wiedemann, Norristown, Pa., assignor to Wiedemann Machine Company, Philadelphia, Pa., a corporation of Pennsylvania Application September 18, 1953, Serial No. 381,058, which is a division of application Serial No. 186,160, September 22, 1950, now Patent No. 2,701,017, dated February 1, 1955. Divided and this application September 12, 1956, Serial No. 609,391

3 Claims. (Cl. 188—43)

The present invention relates to a clamping mechanism for use in connection with a trolley, suitably on a machine tool.

The present application is a division of application Serial No. 381,058, filed September 18, 1953, for High Speed Follower Gauge Trolley Structure which, in turn, is a division of application Serial No. 186,160 filed September 22, 1950, for High Speed Follower Gauge and Punch, now U. S. Patent No. 2,701,017. Reference is made to this patent for more complete description of the structure.

A purpose of the invention is to provide a simple clamp which will operate effectively to hold a guage bar at any desired position along the rails, utilizing a cam mounted on and moving with the gauge bar and engaging clamping jaws, and riding a slotted crank which is relatively stationary except for rotation.

Further purposes appear in the specification and in the claims.

In the drawings I have chosen to illustrate one only of the numerous embodiments in which my invention may appear, with a variation, the form and variation shown being chosen from the standpoints of convenience in illustration, satisfactory operation and clear demonstration of the principles involved.

Figure 1 is a fragmentary enlarged top plan view looking down on the table employed in the present invention.

Figure 2 is an enlarged fragmentary section taken on the line 2—2 of Figure 1 and showing the clamp for the gauge bar.

Figure 3 is a section taken on the line 3—3 of Figure 2.

Figure 4 is a plan section of the clamp taken on the line 4—4 of Figure 2 with certain parts located above the plane of the section appearing in dot-and-dash lines.

Describing in illustration but not in limitation and referring to the drawings:

Rails are provided over which a trolley moves, and on one of the rails a clamping jaw rides which is operated by a lever cam carried by the trolley. The lever cam rides in a longitudinal slot which is stationary except for rotation and extends longitudinally of the gauge bar, so as to permit clamping at any position of the trolley.

While the invention is believed to find its widest application in turret punch presses, it will be understood that it can be employed in any machining operation where a predetermined location is to be achieved on work controlled by a template, whether the ultimate machining operation be sewing, drilling, milling or any other suitable operation which can be performed on sheet work.

A generally horizontal work table 100 has a bed 101, and at the sides the bed supports rails 133 having laterally or outwardly extending surfaces 134, upwardly extending surfaces 135 and downwardly extending surfaces 136. The rails are engaged at the sides of the table by trolleys 137 which support a gauge bar 138 extending across the table.

The trolleys and gauge bar are clamped in any desired position by a clamping handle 163 (Figures 1, 2, and 4), which journals on shaft 164 in bearing 165 beneath the bed. The clamping handle 163 is connected with the clamping mechanism on the trolley by any suitable linkage, here shown to consist of crank arm 166 on the shaft 164, which pivotally connects at 167 with adjustable link 168, which at its opposite end pivotally connects at 170 with bell crank 171. Bell crank 171 is made up of crank lever 172 which engages the link shaft 173 which journals at 174 beneath the bed, and elongated bell crank lever 175 extending lengthwise of the bed and consisting of mounting prongs 176 on the shaft and spaced lever bars 177 which form an elongated slot 178 immediately inside one of the rails.

One of the trolleys as shown in Figures 2 and 4 has a bracket 180 open in the interior and provided with top and bottom aligned vertical bearings 181 and 182. A clamping member 183 has pivots 184 in the bearings 181 and 182 with sufficient freedom to move up and down for clamping. An upper jaw 185 of the clamping member 183 rides the top of the rail on the surface 135. Beneath the downwardly directed surface 136, bracket projections 186 mount a pivot 187 which pivotally supports a cam lever 188 having a cam face 190 (Figure 2) which engages and contacts a lower clamping jaw 191 cooperating with the lower surface 136 of the rail. The arms of the jaw 191 have elongated slots 187' riding the pivot 187. The cam lever has a lever end 192 which rides in the elongated slot 178 of the bell crank and thus is in position for clamping action no matter where the trolleys and gauge bar move.

In operation it will be understood that by manipulating the handle 163 it is possible to clamp the gauge bar with accuracy at any position along the trolley.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a trolley mechanism, a support, a rail mounted on the support and having opposed surfaces, a trolley riding the rail, opposed clamping jaws mounted on the trolley and engaging the opposed surfaces of the rail, a cam lever pivotally mounted on the trolley on an axis longitudinal of the rail and operatively engaging one of the clamping jaws in a direction to move said jaw to tighten it against the rail, a crank pivotally mounted on the support on an axis longitudinal of the rail and having a slot extending longitudinally of the rail directed toward and surrounding one end of the cam lever remote from the clamping jaw engaged by the cam lever, the crank maintaining contact with said end of the cam lever as the trolley moves, and lever means operative to swing the crank around its axis and tighten the cam lever against the jaw with which the cam lever is in contact.

2. A trolley mechanism of claim 1, in combination with bearings vertically spaced in the trolley adjacent one side of the rail, trunnions having a vertical axis and having vertical freedom of motion mounted in the bearings, the opposed clamping jaws being mounted on the trunnions, and the cam lever being pivoted on the trunnions.

3. A trolley mechanism of claim 2, in which one of the opposing clamping jaws is carried by the other.

References Cited in the file of this patent

UNITED STATES PATENTS

| | | |
|---|---|---|
| 205,537 | Garrison | July 2, 1878 |
| 454,306 | Tobey | June 16, 1891 |
| 722,066 | Wellman et al. | Mar. 3, 1903 |
| 878,484 | Moore | Feb. 4, 1908 |
| 1,685,072 | Klausmeyer | Sept. 18, 1928 |